United States Patent [19]

Pryjmak

[11] Patent Number: 4,616,151
[45] Date of Patent: Oct. 7, 1986

[54] ARMATURE WITH QUIET CORE CONSTRUCTION

[75] Inventor: Bohdan I. Pryjmak, Dayton, Ohio

[73] Assignee: General Motors Corporation, Detroit, Mich.

[21] Appl. No.: 679,244

[22] Filed: Dec. 7, 1984

[51] Int. Cl.$^4$ .............................................. H02K 1/00
[52] U.S. Cl. ..................................... 310/216; 310/51; 310/269
[58] Field of Search ................ 310/195, 216, 51, 261, 310/262–265, 267, 269, 217, 218, 42, 154, 195, 198, 208.46; 336/212, 217

[56] References Cited

U.S. PATENT DOCUMENTS

| | | | |
|---|---|---|---|
| 1,861,059 | 5/1932 | Johnson | 310/51 |
| 2,039,547 | 5/1936 | Mikulic | 310/40 R |
| 2,648,788 | 8/1953 | Fleischer | 310/51 |
| 3,307,059 | 2/1967 | Kitano | 310/216 |
| 3,586,893 | 6/1971 | Okamoto | 310/165 |
| 4,126,797 | 11/1978 | Kling | 310/46 |
| 4,264,836 | 4/1981 | Dukshtau | 310/261 |
| 4,467,234 | 8/1984 | Tahara | 310/195 |
| 4,489,249 | 12/1984 | Oliver | 310/216 |

FOREIGN PATENT DOCUMENTS

| | | | |
|---|---|---|---|
| 2367370 | 5/1978 | France | 310/217 |
| 1073843 | 2/1984 | U.S.S.R. | 310/216 |

OTHER PUBLICATIONS

"Effect of Skewing and Pole Spacing on Magnetic Noise in Electrical Machinery"; Mikina; ASME, vol. 5, 1934, pp. 711–720.

Primary Examiner—R. Skudy
Attorney, Agent, or Firm—Robert M. Sigler

[57] ABSTRACT

An armature for a DC motor comprises a laminated core defining poles extending generally axially, each pole comprising a body portion with a winding thereabout and a plurality of axially disposed tooth portions, each tooth portion exhibiting a primary skew of its laminations in one direction while the tooth portions of each pole exhibit a smaller secondary skew in the opposite direction. The primary skew is produced by arms extending circumferentially from radial body portions in consecutive laminations which become progressively longer on one side and shorter on the other side of the body portions. Magnetic force fluctuations between the armature and field magnets of the case are modified so as to produce less audible noise with armature rotation.

6 Claims, 3 Drawing Figures

ARMATURE WITH QUIET CORE CONSTRUCTION

BACKGROUND OF THE INVENTION

This invention relates to wound multipole armatures for DC motors of the type having cylindrical cases with permanent field magnets attached therein. Such motors are subject to audible noise caused by excitation of resonant case vibration modes by the alternating pattern of magnetic forces between the armature and field magnets during armature rotation.

In the case of a ten pole armature having a straight axial slot core construction, each revolution of the armature results in ten alternations of slot and pole past an axial reference line on the case. This results in a regular pattern of alternating attraction and repulsion with armature rotation. If the overall pattern excites a resonant vibrational mode of the case, the case will vibrate strongly and, in so doing, generate audible noise at a frequency which is a whole number multiple of the rotational speed of the armature. Of course, such noise depends upon the exact construction of the case and field magnets; but a cylindrical case of comparatively light construction can generally be expected to have the requisite excitable resonant vibrational modes.

Many of the type of motors under consideration have been provided with armatures having a straight skew slot and pole construction, wherein the slots and poles are skewed from the axial direction by an acute angle such as 14 degrees. Although this might be thought to alleviate the vibration problem, in many cases it accomplishes little in this area. Each axial reference line on the case still sees, on the whole, an alternation in the number of slots passing it as the armature rotates. In addition, the forces generated travel axially along the full length of the case due to the skew; and this motion excites other resonant vibrational modes of a cylindrical case structure.

SUMMARY OF THE INVENTION

This invention provides an armature for a motor of the type described above with novel core construction which interacts magnetically with the field and case structure so as to reduce the excitation of resonant case vibration modes and thus produce quieter motor operation.

In particular, the armature of this invention has a laminated core defining poles extending generally axially, each pole comprising a body portion with a winding thereabout and a plurality of tooth portions, each tooth portion exhibiting a primary skew of its laminations in one direction while the tooth portions themselves exhibit a smaller secondary skew in the opposite direction. The body portion is formed by aligned radial body portions in consecutive laminations; and the tooth portions are formed by arms extending circumferentially from the radial body portions of consecutive laminations, the arms being progressively longer on one side of the bodies and progressively shorter on the other side in consecutive laminations within each tooth portion.

The core construction of this armature provides a scattering of the magnetic forces across the field and case structure in such a way as to reduce excitation of the resonant modes of the case. The amplitude of magnetically caused case vibrations, and thus the magnetic noise of the motor, is significantly reduced. Further details and advantages of this invention will be apparent from the accompanying drawings and following description of a preferred embodiment.

DESCRIPTION OF THE PREFERRED EMBODIMENT

Figure 1:
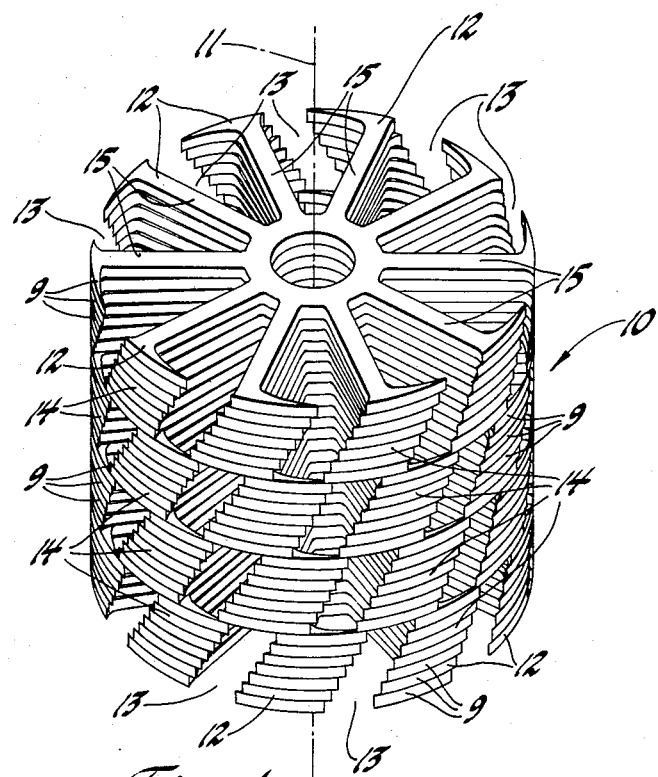
FIG. 1 shows a perspective view of the core construction of an armature for an electric motor.

FIG. 1 shows the core 10 of an armature according to this invention, with the remainder of the armature being of standard construction. The armature is to be used in a standard cylindrical case 40 having permanent field magnets 42 affixed therein. Armature core 10 comprises a plurality of iron laminations 9 which are stacked on the armature shaft, not shown, to form poles 12 separated by slots 13.

Figure 2:
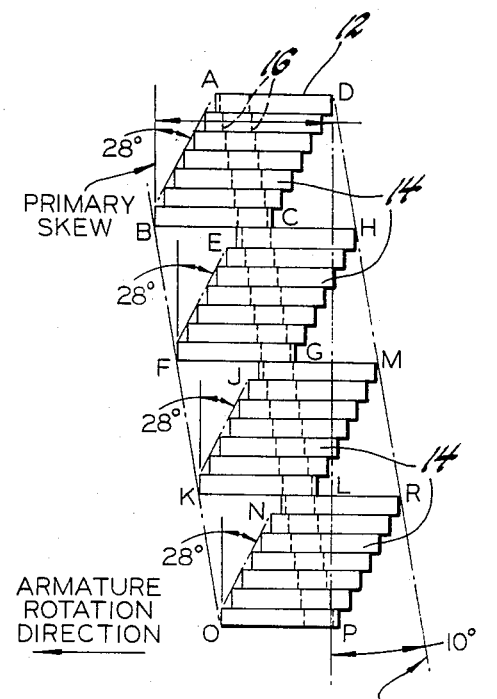
FIG. 2 shows a schematic diagram of the geometric relationships in the poles of the core structure of FIG. 1.

The armature axis is shown at 11. Each pole 12 comprises a plurality—four in this example—of tooth portions 14 which exhibit a primary skew angle relative to axis 11, the primary skew angle in this example being 28 degrees or double the normal skew angle for such armatures. However, as seen in FIGS. 1 and 2, the tooth portions 14 of each pole 12 exhibit a smaller secondary skew in the opposite direction from that of the primary skew: 10 degrees in this example. Each pole 12 also comprises a body portion 15 extending the full length thereof about which an armature winding 44 is wound. Body portion 15 is formed from aligned body portions of successive individual laminations and is marked in FIG. 2 by the dashed lines 16 extending at the secondary skew angle of 10 degrees from the vertical in this embodiment. The angle of body portion does not have to be the secondary skew angle; nor do the individual sections of the body portion corresponding to each tooth portion 14 have to be exactly in line. However, the individual sections must be sufficiently in line to form a single body portion about which a winding may be formed. Tooth portions 14 are formed in a manner to be described at a later point in this specification.

The actual number of tooth portions 14 on each pole, the primary skew angle of each tooth portion 14 and the secondary skew angle of each pole 12 are chosen to create a core structure in which body portions 15 are formed for winding and in which, as the armature rotates, the individual tooth portions 14 pass an axial reference line on the motor case at slightly different times with some overlapping, so as to somewhat distribute the forces between the poles 12 of the armature 10 and the magnets of the stator and reduce the excitation of resonant vibrational modes in the case. Referring to FIG. 2, the uppermost tooth portion 14 will be the first to begin to pass the axial reference line, with the force fluctuation proceeding axially upward from point B toward point A and the force contribution of this tooth portion to the stator magnet increasing gradually as more laminations are added. Before the force fluxuation reaches point A, however, the next lower tooth portion 14 begins passing the axial reference line with the force fluxuation proceeding upward from point F toward point E. The pattern continues for the remaining tooth portions of the pole. A similar pattern exists for the trailing edge of each tooth portion 14, with the force fluctuation of the first tooth portion 14 proceeding from point C up to point D. There is an overlap of poles, in that point B of the next pole will pass the axial line before points R, M and, in this embodiment, H of the current pole. However, this overlap does not correspond to that of a conventionally single skewed pole armature, since it is associated with the secondary skew in the opposite direction from the primary skew. An examination of the geometry of FIGS. 1 and 3 should demonstrate that the magnetic force fluctuations are scattered and move axially across different portions of the case. It is found that these force fluctuations provide a greatly reduced excitation of the resonant modes of a cylindrical case.

Figure 3:
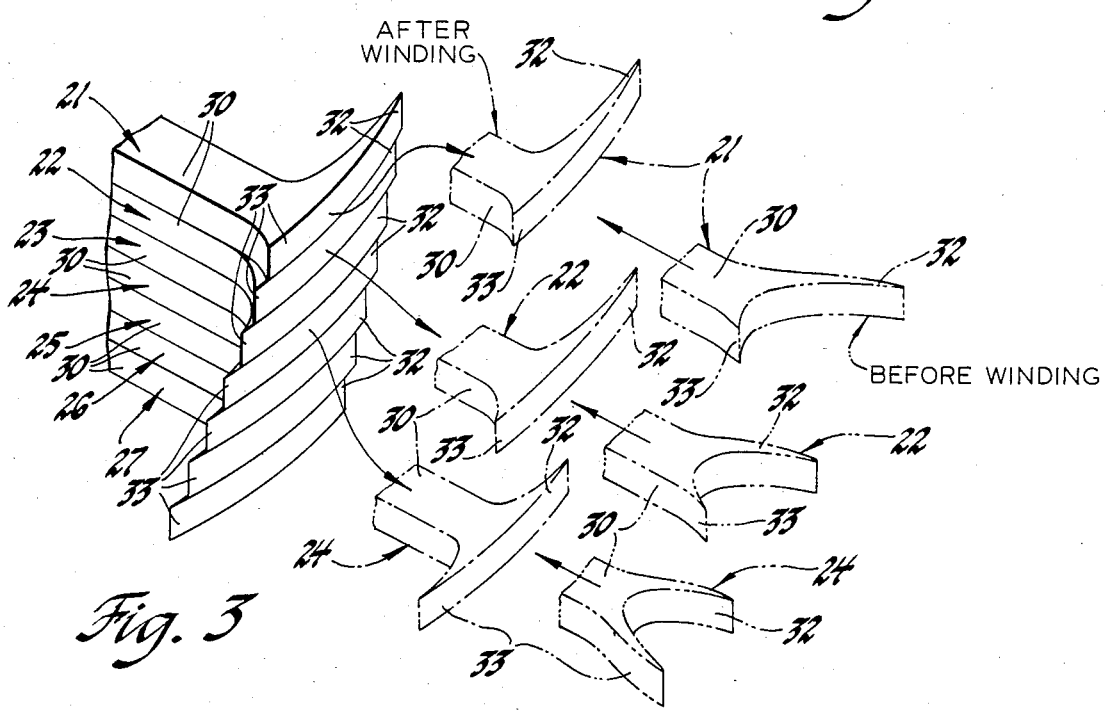
FIG. 3 shows a perspective view of one tooth section of a core structure of FIG. 1 and an exploded view of several of the laminations of the tooth structure showing the laminations before and after armature winding.

The manner of obtaining tooth portions 14 with a primary skew while body portion 15 maintains a base for armature windings is shown in FIG. 3. A plurality of different lamination patterns 21–27 are used in a group for each tooth portion, each lamination having, for each pole 12 thereof, a radial body portion 30 with arms 32, 33 extending circumferentially in opposite directions from the outer end thereof. In the completed armature, the arms of consecutive laminations on one side of the bodies increase in length, while the arms of the same laminations on the other side decrease in length. The outer edges of the tooth portions 14 therefore form the primary skew with the armature axis. The secondary skew results from a skewed alignment of the tooth portions, with a similarly skewed alignment of the body portions 30 of consecutive laminations 21–27 in this embodiment.

The core construction shown is not the easiest for armature winding, due to the tendency of the overlap of tooth portions to close the slots in certain places. However, it may be accomplished as indicated in FIG. 3. The laminations are stamped with the arms 32,33 bent radially outward and remain in that state during assembly until the armature winding is complete. This creates large slot openings to facilitate winding insertion. After winding is complete, the arms are rolled over into the desired orientation.

The embodiments of the invention in which an exclusive property or privilege is claimed are defined as follows:

1. An armature for use in a DC motor of the type subject to noise-causing case vibrations in characteristic modes due to periodic variations in magnetic forces between armature poles and field magnets during armature rotation, the armature comprising a laminated core defining poles extending generally axially, each of said poles comprising a body portion with a winding thereabout and a plurality of axially disposed tooth portions, each tooth portion exhibiting a primary skew of its laminations in one direction while the tooth portions of each of said pole exhibit a smaller secondary skew in the opposite direction, whereby magnetic forces between the armature and said field magnets are modified so as to produce less audible noise with armature rotation.

2. The armature of claim 1 in which the number of tooth portions of each of said poles is four, the primary skew is approximately 28 degrees and the secondary skew is approximately 10 degrees.

3. An armature for use in a DC motor of the type subject to noise-causing case vibrations in characteristic modes due to periodic variations in magnetic forces between armature poles and field magnets during armature rotation, the armature comprising a laminated core defining poles extending generally axially, each of said poles comprising an essentially straight body portion comprising the aligned, radially extending bodies of individual consecutive laminations and having a winding thereabout, each pole further comprising a plurality of axially disposed tooth portions, each of said tooth portions comprising arms extending circumferentially from the bodies of a plurality of consecutive laminations, the arms of consecutive laminations on one side of the bodies progressively increasing in length and the same arms on the other side progressively decreasing in length to give said each of said tooth portions a primary skew of its laminations in one direction while the tooth portions of each of said poles exhibit a smaller secondary skew in the opposite direction, whereby magnetic forces between the armature and said field magnets are modified so as to produce less audible noise with armature rotation.

4. The armature of claim 3 in which the number of tooth portions of each of said poles is four, the primary skew is approximately 28 degrees and the secondary skew is approximately 10 degrees.

5. An armature for use in a DC motor of the type subject to noise-causing case vibrations in characteristic modes due to periodic variations in magnetic forces between armature poles and field magnets during armature rotation, the armature comprising a laminated core defining poles extending generally axially, each of said poles comprising an essentially straight body portion comprising the aligned, radially extending bodies of individual consecutive laminations and having a winding thereabout, each of said poles further comprising a plurality of axially disposed tooth portions, each of said tooth portions comprising arms extending circumferentially from the bodies of a plurality of consecutive laminations, the arms of consecutive laminations on one side of the bodies progressively increasing in length and the same arms on the other side progressively decreasing in length to give said each of said tooth portions a primary skew of its laminations in one direction while the tooth portions of each of said poles exhibit a smaller secondary skew in the opposite direction, the straight body portion also exhibiting the secondary skew, whereby magnetic forces between the armature and said field magnets are modified so as to produce less audible noise with armature rotation.

6. The armature of claim 5 in which the number of tooth portions of each of said poles is four, the primary skew is approximately 28 degrees and the secondary skew is approximately 10 degrees.

* * * * *